United States Patent [19]
Callaway

[11] 3,982,597
[45] Sept. 28, 1976

[54] SNOWMOBILE SKI DAMPENER ARRANGEMENT

[75] Inventor: Mel Callaway, Riverside, Calif.

[73] Assignee: Yamaha International Corporation, Buena Park, Calif.

[22] Filed: Jan. 10, 1975

[21] Appl. No.: 540,094

[52] U.S. Cl. .............................. 180/5 R; 280/21 A; 244/108
[51] Int. Cl.² ........................................ B62M 27/02
[58] Field of Search......... 180/5 R; 280/21 R, 21 A, 280/25; 244/108; 267/17, 18, 31, 32

[56] References Cited
UNITED STATES PATENTS

| | | | |
|---|---|---|---|
| 3,726,354 | 4/1973 | LaPlante | 180/5 R |
| 3,731,755 | 5/1973 | Dretzka | 180/5 R |
| 3,777,831 | 12/1973 | Hale | 180/5 R |
| 3,786,886 | 1/1974 | Bombardier | 180/5 R |
| 3,835,947 | 9/1974 | Alexander | 180/5 R |
| 3,844,366 | 10/1974 | Rose | 180/5 R |

Primary Examiner—Kenneth H. Betts
Assistant Examiner—John A. Carroll
Attorney, Agent, or Firm—Lindenberg, Freilich, Wasserman, Rosen & Fernandez

[57] ABSTRACT

A snowmobile ski suspension of the type that utilizes a long leaf spring to support the snowmobile frame on each ski, wherein the shock dampener extends primarily vertically, with the piston of the dampener passing through a hole at the middle of the leaf spring. The cylinder of the shock dampener connects the steering linkage to the middle of the leaf spring, to transmit steering torque.

9 Claims, 5 Drawing Figures

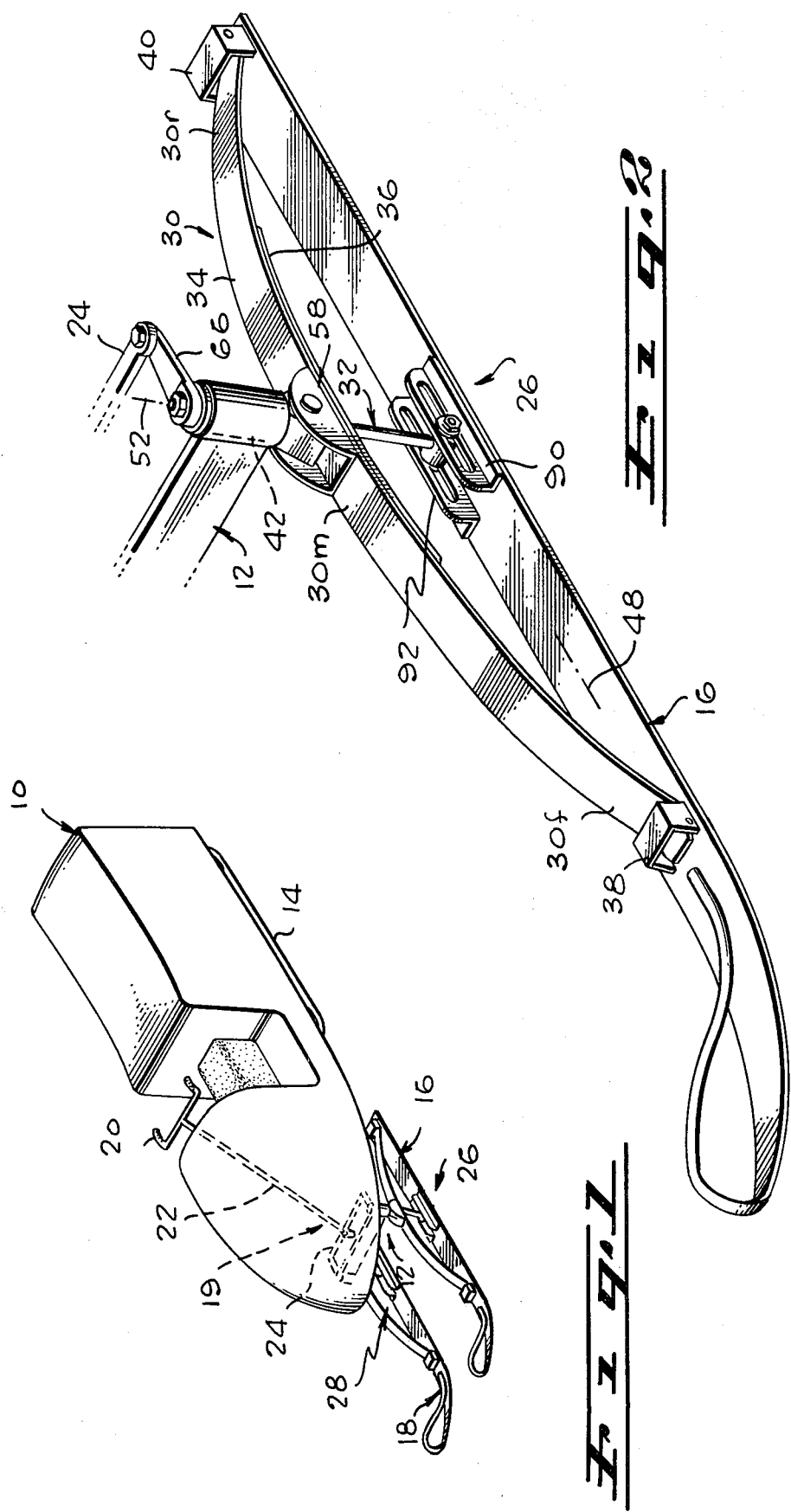

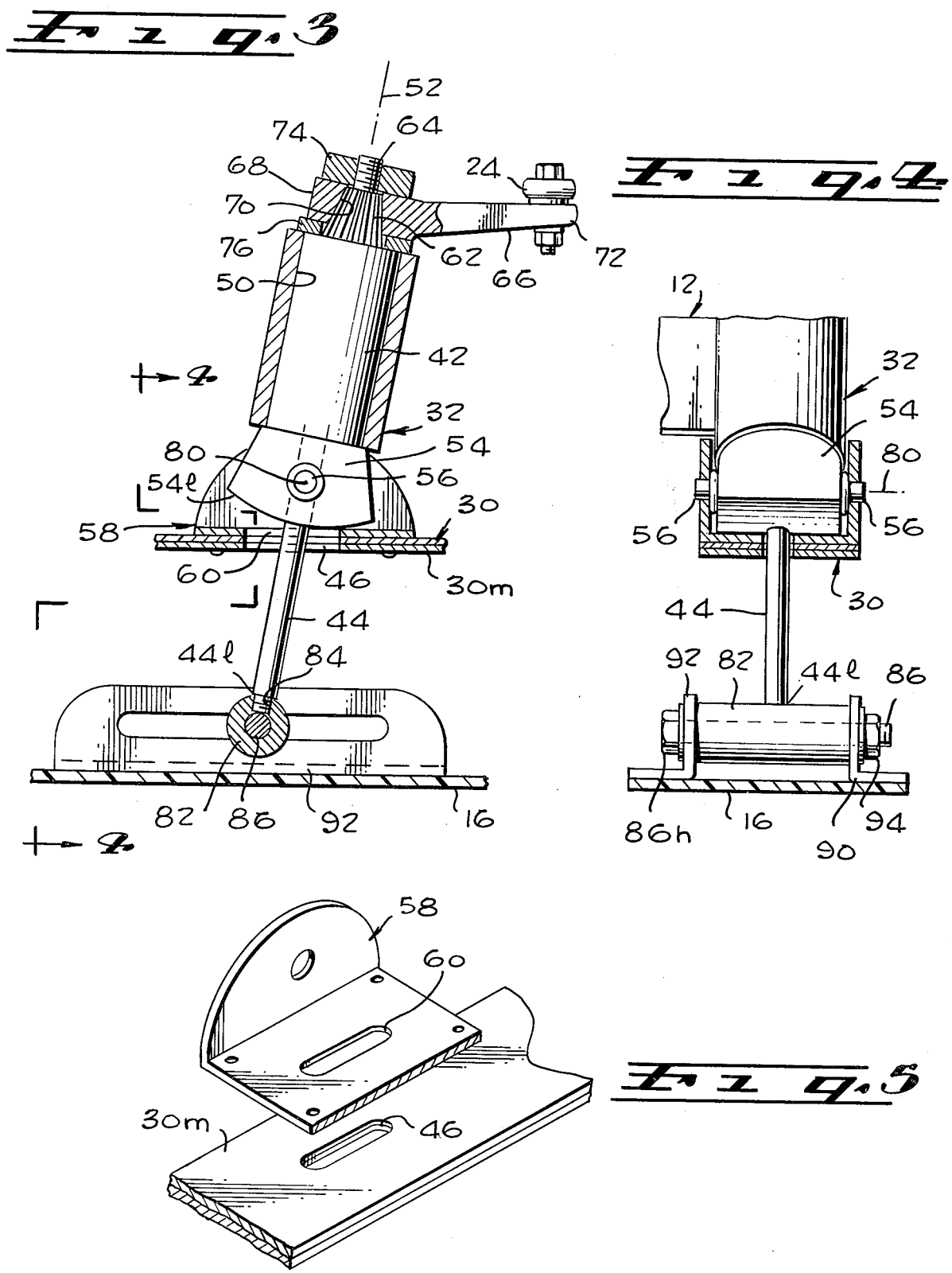

SNOWMOBILE SKI DAMPENER ARRANGEMENT

BACKGROUND OF THE INVENTION

This invention relates to ski suspension apparatus for snowmobiles and the like.

A typical snowmobile includes a pair of skis, each ski coupled to the frame by a leaf spring and a shock dampener. The leaf spring has opposite ends mounted on the ski and a middle connected to the frame of the snowmobile. The shock dampener typically lies over the front half of the leaf spring, with the cylinder of the dampener connected to the middle of the leaf spring and the piston of the dampener connected to the front portion of the ski. The primary purpose of the dampener is to dampen up and down vibrations of the snowmobile frame. However, the effectiveness of the dampener is reduced by the fact that it must extend primarily horizontally in order to lie clear of the leaf spring. A design which permitted a more vertical orientation of the dampener and which otherwise simplified the connection of the frame to the ski, would provide a lower cost and more efficient ski suspension arrangement.

SUMMARY OF THE INVENTION

In accordance with one embodiment of the invention, a snowmobile ski suspension system is provided which utilizes a shock dampener extending in a primarily vertical orientation so that it is efficiently utilized. The suspension system includes a leaf spring with opposite ends mounted on a ski and a middle portion which lies above the ski. A dampener is provided which has a cylinder lying above the middle portion of the leaf spring and a piston extending through a hole in the leaf spring to the ski. The cylinder of the shock dampener is pivotally mounted on the frame, and the cylinder connects the steering linkage to the leaf spring, so that the ski can be steered by transmitting torque through the cylinder. In order to enable pitching of the ski, the cylinder is pivotally mounted about a horizontal axis on the leaf spring, while the lower end of the piston is mounted to slide longitudinally on the ski.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a snowmobile constructed in accordance with the present invention;

FIG. 2 is a partial perspective view showing the ski suspension system of the snowmobile of FIG. 1;

FIG. 3 is a partially sectional side elevation view of the suspension system of FIG. 2;

FIG. 4 is a view taken on the line 4—4 of FIG. 3; and

FIG. 5 is a partial exploded view of the leaf spring and cylinder-mounting bracket of FIG. 2.

DESCRIPTION OF THE PREFERRED EMBODIMENT

FIG. 1 illustrates a snowmobile 10 that has a frame 12 with a rear portion supported and propelled along the ground by an engine-driven track drive 14 and a front portion supported on the ground by a pair of skis 16, 18. The vehicle has a manually controlled steering mechanism 19 that includes a handlebar steering control 20 on pivotally mounted steering shaft 22, which moves a steering rod 24 laterally, the ends of the steering rod being coupled to the skis 16, 18 to turn them and steer the vehicle. Each of the skis 16, 18 is coupled by a separate suspension system 26, 28 to the frame 12 and to the manually controllable steering mechanism, the two suspension systems being similar.

As illustrated in FIGS. 2–5, the suspension system 26 for the ski 16 includes a leaf spring 30 for supporting the frame 12 on the ski 16, and a shock dampener 32 which also couples the frame to the ski, the shock dampener 32 serving to dampen oscillations induced by the leaf spring. The spring 30, which includes a plurality of resilient leaves 34, 36, has front and rear ends 30f, 30r mounted at longitudinally spaced locations on the ski by a pair of brackets 38, 40. The brackets permit sufficient freedom of movement of the spring ends so that the middle portion 30m of the spring can move up and down. The dampener 32 includes a pneumatic cylinder 42 which lies above the leaf spring 30 and a piston 44 with an upper end that is slidably received in the cylinder and a lower end 44l which is mounted on the ski. The leaf spring 30 is formed with a hole 46 in the middle part 30m thereof, and the piston 44 projects through the hole 46 in its extension between the cylinder and ski. By forming a hole in the leaf spring and projecting the shock dampener piston through the hole, the shock dampener can be mounted so it extends in a primarily vertical position and with the single shock dampener centered on the ski, or in other words, lying over the center line 48 of the ski.

The cylinder 42 of the shock dampener is pivotally received in a hole 50 formed in a member of the snowmobile frame 12 to permit the shock dampener 32 to pivot about an axis 52 that extends primarily vertically, or, in other words, with a greater vertical than horizontal directional component (i.e. it extends at less than 45° from the vertical). The lower end of the shock dampener cylinder 42 has a mount 54 with a pair of trunnions 56 that are pivotally received on a mounting bracket 58 that is securely fastened to the middle portion 30m of the leaf spring. The bracket 58 has a hole 60 aligned with the hole 46 in the leaf spring, to permit the extension of the piston therethrough. The upper portion of the shock dampener cylinder 42 includes a tapered splined shaft 62 with a threaded end 64. A steering link 66 which couples the steering rod 24 to the shock dampener cylinder 42, has an inner end 68 with a splined aperture 70 that receives the splined shaft 62 on the cylinder. The link 66 also has an outer end 72 which is pivotally coupled to the steering rod 24. When the steering rod 24 shifts laterally, the steering link 66 turns the cylinder 42 which, in turn, turns the bracket 58 and the leaf spring 30 to thereby turn the ski 16 and steer the vehicle. The steering link 66 is secured to the cylinder by a nut 74 threaded onto the upper threaded end 64 of the cylinder, and the link is securely held to the cylinder while permitting rotation of the link relative to the frame 12 by means of a low friction washer 76. Thus, the shock dampener 32 is pivotally mounted on the frame and serves to couple the steering link 66 to the leaf spring 30 to transmit steering torque.

When the snowmobile passes over rough terrain, the skis often undergo pitching movements; that is, the front of the ski moves up and down with respect to the rear of the ski. In order to accommodate such pitching, the lower end of the shock dampener cylinder 42 is pivotally mounted by the trunnions 56 on the leaf spring, and the lower end 44*l* of the piston is slidably mounted on the ski. The trunnions 56 permit the lower end of the cylinder 42 to pivot about a horizontal and laterally-extending axis 80 with respect to the leaf spring during pitching of the ski. During such pivoting at axis 80, the leaf spring moves longitudinally with respect to the piston 44, and accordingly, the holes 46, 60 in the leaf spring and bracket 58 are elongated. As a further consequence of such pivoting at the lower end of the cylinder at axis 80, the lower end 44*l* of the piston tends to slide longitudinally with respect to the ski. To allow for such sliding, a slide rod 82 is attached to the lower end of the piston, by screwing the threaded lower end of the piston into a corresponding hole 84 formed in the slide rod. A bolt 86 extends in a lateral direction through a hole in the slide rod, and the ends of the bolt 86 serve as slide bearings that slide along guideways 88 formed in a pair of slide brackets 90, 92, that are fixed to the middle portion of the ski 16 and that also serve as slide bearings. One end of the slide bolt 86 has a head 86*h* while the other end is held by a high friction nut 94 that can be adjusted in tightness to control the amount of friction of sliding of the piston lower end along the ski. It may be noted that during pitching of the ski, the leaf spring also pitches, and accordingly, the lower surface 54*l* of the cylinder is cut away at the front and rear to prevent interference with free pivoting of the leaf spring and the bracket 58 thereto.

Thus, the invention provides a ski suspension system which efficiently utilizes a ski dampener that provides a coupling of the frame to the ski in parallel with a spring to dampen oscillations. The ski dampener is allowed to be mounted in a primarily vertical orientation and substantially centered over the center line of the ski, by projecting a piston of the dampener through a hole formed in a center portion of the leaf spring. Steering torque is transmitted through the cylinder of the shock dampener by pivotally mounting the cylinder of the dampener on the frame of the snowmobile, coupling the upper portion of the cylinder to the manually controllable steering linkage of the snowmobile, and coupling the lower portion of the cylinder to the leaf spring. Although the piston of the shock dampener extends primarily vertically to a middle portion of the ski, the ski is not prevented from pitching, because the lower end of the piston is slidably mounted on the ski while the cylinder is pivotally mounted on the spring.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In a snowmobile having a frame with a front portion, the improvement comprising:
   a horizontally-extending ski;
   a leaf spring having forward and rearward ends coupled to locations spaced along the length of said ski, and having a middle portion vertically spaced from said ski;
   a shock dampener including a cylinder member and a piston member slidable in said cylinder member, a first of said members coupled to the middle portion of said leaf spring and the second of said members extending downwardly from said first member to a location lying below the level of the middle of said leaf spring and being coupled to said ski;
   said shock dampener extending in a primarily vertical direction, with the lower end of said second member lying approximately halfway between said opposite ends of said leaf spring.

2. A snowmobile comprising:
   a frame having front and rear portions;
   means for supporting the rear portion of said frame on the ground;
   a ski supported on the ground at the front portion of said frame;
   a leaf spring extending in an elongated bow with opposite ends mounted on said ski and a middle portion lying above said ski, said leaf spring having a hole in said middle portion;
   a dampener having a cylinder with a lower end lying over said middle portion of said leaf spring and having a piston with an upper end passing through said hole in said leaf spring and a lower end coupled to said ski; and
   means for coupling said front portion of said frame to said middle portion of said leaf spring.

3. The snowmobile described in claim 2 wherein:
   said coupling means pivotally connects said frame to said cylinder to permit relative rotation of said frame and cylinder about a vertical axis, and said cylinder is coupled to said leaf spring to prevent relative rotation of said cylinder to said spring about a vertical axis so that steering torque can be transmitted from said cylinder to said spring; and including
   a manually movable steering control mounted on said frame; and
   a steering linkage coupling said steering control to said cylinder to pivot said cylinder in response to movement of said steering control.

4. The snowmobile described in claim 2 including:
   a pair of slidably engaged bearing means, one mounted on said lower end of said piston and the other mounted on said ski, for coupling said lower end of said piston to said ski to permit relative movement of said piston end to said ski in a direction substantially only along the length of said ski.

5. In a snowmobile having a frame with a front portion, and having a manual steering control, the improvement comprising:
   a shock dampener which includes a cylinder pivotally coupled about a primarily vertical axis to said front frame portion, said dampener also including a piston extending downwardly from said cylinder;
   a steering link coupling said manual steering control to said cylinder to pivot said cylinder in reponse to operation of said steering control;
   a ski;
   a leaf spring with forward and rearward ends mounted on said ski, said leaf spring having a middle portion with a hole;
   a bracket mounting said cylinder on said middle portion of said leaf spring, said piston extending downwardly through said hole in said leaf spring; and
   means for coupling the lower end of said piston to said ski.

6. The improvement described in claim 5 wherein:
   said cylinder is pivotally mounted about a substantially horizontal axis on said bracket, and said means for coupling the lower end of said piston to said ski allows slidable movement of said lower piston end along the length direction of the ski.

7. In a snowmobile having a frame with a front portion, the improvement comprising:
    a horizontally-extending ski;
    a leaf spring having forward and rearward ends coupled to locations spaced along the length of said ski, and having a middle portion vertically spaced from said ski; and
    a shock dampener including a cylinder member and a piston member slidable in said cylinder member, a first of said members coupled to the middle portion of said leaf spring and the second of said members coupled to said ski;
    said leaf spring having a hole in said middle portion thereof, and at least one of said shock dampener members extending through said hole.

8. In a snowmobile having a frame with a front portion, the improvement comprising:
    a horizontally-extending ski;
    a leaf spring having forward and rearward ends coupled to locations spaced along the length of said ski, and having a middle portion vertically spaced from said ski;
    a shock dampener including a cylinder member and a piston member slidable in said cylinder member, a first of said members coupled to the middle portion of said leaf spring; and
    means for coupling the lower end of a second of said members of said shock dampener to said ski, said coupling means confining the lower end of said second member to sliding on said ski in a direction along the length of said ski, as well as pivoting about a laterally-extending axis, whereby to facilitate pitching movement of the ski.

9. In a snowmobile having a frame with a front portion, the improvement comprising:
    a horizontally-extending ski;
    a leaf spring having forward and rearward ends coupled to locations spaced along the length of said ski, and having a middle portion vertically spaced from said ski;
    a shock dampener extending in a primarily vertical direction and including a cylinder and a piston slidable in said cylinder, the lower end of said piston lying below the level of the middle portion of said leaf spring and approximately at the level of the ends of said leaf spring and being coupled to said ski, and said cylinder being connected to the middle portion of said leaf spring to prevent relative movement about a vertical axis so that said cylinder member can transmit steering torque to said leaf spring;
    said frame being pivotally supported on said cylinder member to permit relative pivoting about a primarily vertical axis, and including
    a manually controllably steering link connected to said first dampener member to pivot said dampener member about a substantially vertical axis.

* * * * *